Patented Nov. 4, 1930

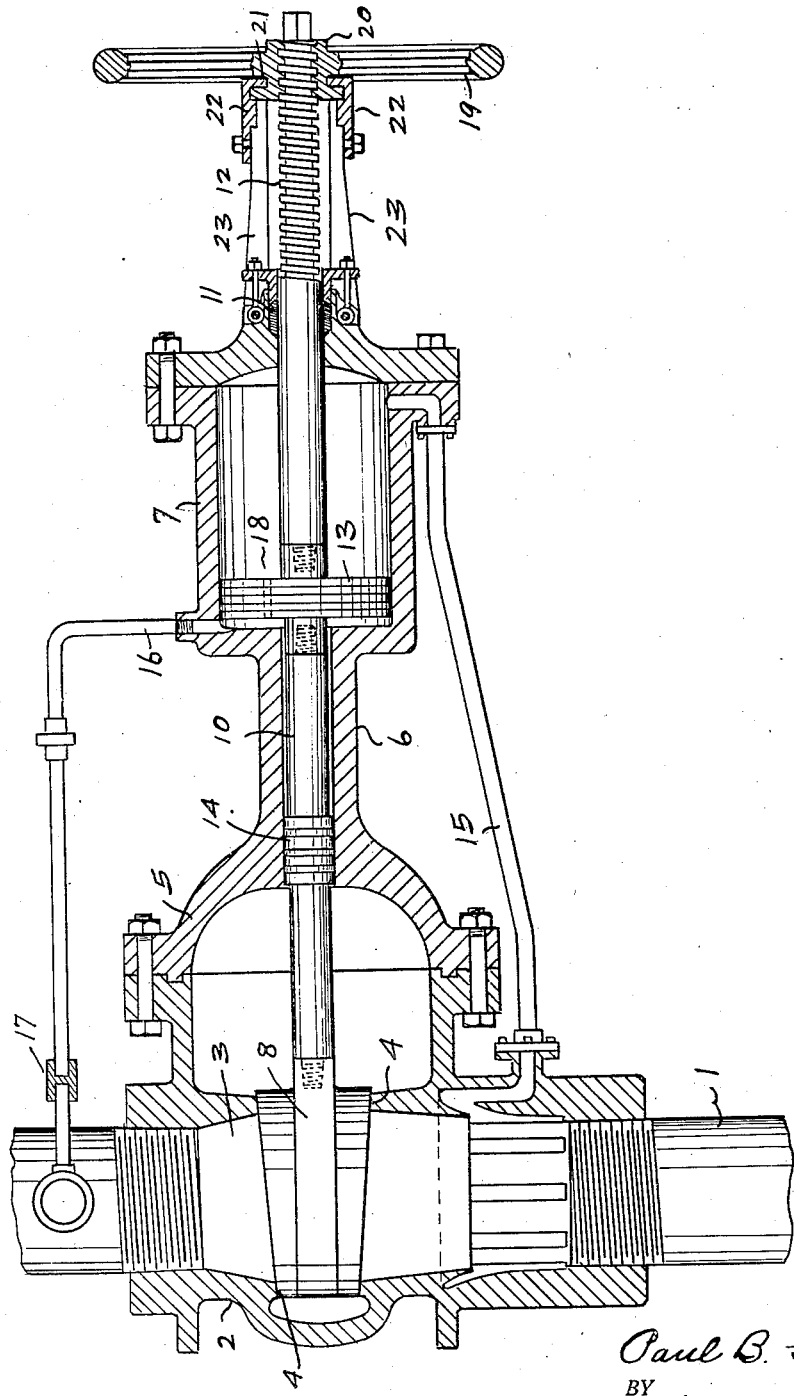

1,780,387

UNITED STATES PATENT OFFICE

PAUL BRYAN HART, OF MARACAIBO, VENEZUELA

AUTOMATIC BLOW-OUT PREVENTER

Application filed August 12, 1927. Serial No. 212,535.

This invention relates to new and useful improvements in an automatic blowout preventer.

One object of the invention is to provide a valve designed to be attached to the upper end of the pipe set in a well bore and equipped with means whereby the valve, in case of necessity, will be automatically operated to close said pipe to prevent the flow of oil or gas therefrom.

Another object of the invention is to provide a valve mechanism of the character described which may be either manually or automatically operated for the purpose intended.

With the above and other objects in view this invention has particular relation to certain novel features of construction, operation and arrangement of parts, an example of which is given in this specification and illustrated in the accompanying drawing wherein:—

The figure shows a longitudinal vertical sectional view of the device.

Referring now more particularly to the drawing the numeral 1 designates the well pipe or tubing, which may extend down in the well to the oil or gas bearing strata and through which the oil or gas may be delivered.

Incorporated into this pipe, preferably above the ground surface, there is the valve casing 2 having the passageway 3, therethrough which is surrounded by the diverging annular valve seats 4, 4. Fastened to one side of the casing 2 there is a bonnet 5 which has an extended sleeve 6 whose outer end supports a cylinder 7. A wedge shaped valve 8 is adapted to cooperate with said seats and is fixed to a stem 10 which extends through said sleeve 6 and cylinder 7 and which works through a stuffing box 11 carried by the outer end of the cylinder and whose outer end is threaded, as at 12.

Within the cylinder 7, and fixed on the stem 10 there is a plunger 13 and the stem 10, within the sleeve 6 carries suitable cup rings or packing, 14 to prevent the escape of pressure fluid from said cylinder 7.

Entering one end of the cylinder 7 there is a fluid pressure line 15 which may be connected with any suitable source of pressure fluid. As shown the line 15 is connected into the pipe 1 beneath the valve casing and through it gas, or oil, under pressure is supplied to the cylinder 7 from the well.

Leading from the other end of the cylinder 7 there is a relief line 16. This line may be connected to the piping above the casing 2 and may be provided with a fusible section, as 17, which normally closes said relief line.

The plunger 13 is provided with a port 18 through which the fluid pressure, on opposite sides of the plunger is normally equalized.

There is a hand wheel 19 whose hub is formed into a nut 20 which may be threaded onto the outer end 12 of the stem 10. The inner end of this nut has an annular groove 21 into which the inwardly turned ends of the retaining fingers 22 project. These fingers are bolted to the outer ends of the supporting arms 23, which in turn are anchored to the adjacent end of the cylinder 7.

When it is desired to manipulate the valve manually this may be accomplished by rotating the hand wheel 19 and the valve 8 thus moved into closed position in contact with the seats 4, 4, or into open position within the bonnet 5.

In case a blow out is anticipated, and it is desired to close the well in such event the valve may be moved to open position and the hand wheel then detached. The pressure being equal on each side of the plunger 13 the valve will be held in open position and if the blowout occurs with sufficient violence to break the pipe 16, or should the gas or oil catch afire and the fusible section 17 become melted, in either case the pressure being relieved on one side of the plunger 13 the pressure on the other side thereof, will operate to close the valve and shut in the well.

While I have shown and described only one form of the apparatus it is obvious that mechanical changes may be made therein and equivalents substituted for the parts shown and I hereby reserve the right to make such structural changes as may be found desirable so long as I do not depart from the principle of the invention as embodied in the appended claims.

What I claim is:—

1. The combination with a pipe, of a valve adapted to open and close the passageway through said pipe, a cylinder, means in the cylinder connected to the valve and separating the cylinder into two chambers, a fluid pressure line entering one of said chambers and a relief outlet leading from the other chamber, said outlet line being normally blocked, and being arranged to be readily disrupted by an external force.

2. The combination with a pipe in a well bore, of a valve operatable to open and close the passageway through the pipe, a cylinder, movable means in the cylinder connected to the valve and separating the cylinder into two chambers, a port connecting said chambers at all times, a fluid pressure line entering one of said chambers, a relief line leading from the other chamber, said relief line being normally closed and being constructed so as to be readily disrupted by an external force and thereby opened to permit the release of fluid pressure from said other chamber.

3. In a blowout preventer for wells, the combination with a pipe in the well, of a valve operatable to open and close the passageway through the pipe, a receiver for fluid under pressure, movable means in the receiver connected to the valve and separating the receiver into two chambers, there being a channel constantly connecting said chambers, a fluid pressure line entering one of said chambers, a relief line leading from the other chamber said relief line being normally closed and being constructed so as to be readily disrupted by an external influence and thereby opened to permit the relief of fluid pressure from said other chamber.

In testimony whereof I have signed my name to this specification.

PAUL BRYAN HART.